(12) United States Patent
Renouard et al.

(10) Patent No.: US 9,929,796 B2
(45) Date of Patent: Mar. 27, 2018

(54) VIRTUAL POLAR SATELLITE GROUND STATION FOR LOW ORBIT EARTH OBSERVATION SATELLITES BASED ON A GEOSTATIONARY SATELLITE POINTING AN ANTENNA OVER AN EARTH POLE

(75) Inventors: Laurent Renouard, Vieille-Toulouse (FR); Martin Agnew, Stansted Mountfitchet (GB); Francis Kinsella, Emsworth (GB); Akos Hegyi, Munich (DE)

(73) Assignee: Airbus Defence and Space SAS, Les Mureaux (FR)

( * ) Notice: Subject to any disclaimer, the term of this patent is extended or adjusted under 35 U.S.C. 154(b) by 1018 days.

(21) Appl. No.: 13/382,492

(22) PCT Filed: Jun. 21, 2010

(86) PCT No.: PCT/EP2010/003735
§ 371 (c)(1),
(2), (4) Date: Mar. 23, 2012

(87) PCT Pub. No.: WO2011/003512
PCT Pub. Date: Jan. 13, 2011

(65) Prior Publication Data
US 2012/0184208 A1    Jul. 19, 2012

(30) Foreign Application Priority Data
Jul. 6, 2009   (EP) .................................. 09290542

(51) Int. Cl.
*H04B 7/185*    (2006.01)

(52) U.S. Cl.
CPC ................ *H04B 7/18521* (2013.01)

(58) Field of Classification Search
CPC ........... H04B 7/18513; H04B 7/18521; H04B 7/18547; H04B 7/18563; H04B 7/18591
See application file for complete search history.

(56) References Cited

U.S. PATENT DOCUMENTS

| 5,218,467 A * | 6/1993 | Ross et al. ................. 398/124 |
| 5,971,324 A * | 10/1999 | Williams et al. .......... 244/158.4 |
| 5,999,127 A * | 12/1999 | Dezelan ..................... 342/359 |
| 6,272,317 B1 * | 8/2001 | Houston ............ H04B 7/18578 342/354 |
| 2002/0077099 A1 * | 6/2002 | LaPrade ............ H04B 7/18578 455/430 |

FOREIGN PATENT DOCUMENTS

| EP | 1 351 413 A1 | 10/2003 |
| WO | WO 2005/109682 A2 | 11/2005 |

OTHER PUBLICATIONS

Corresponding International Search Report with English Translation dated Aug. 23, 2010 (four (4) pages).
(Continued)

*Primary Examiner* — Raymond Dean
(74) *Attorney, Agent, or Firm* — Crowell & Moring LLP (57) ABSTRACT

A satellite system includes a satellite operating in an orbit around the Earth and a satellite operating in another orbit around the Earth. The satellite points a fixed beam at least temporarily to a zone above the Earth's surface through which the satellite passes.

13 Claims, 8 Drawing Sheets

(56) References Cited

OTHER PUBLICATIONS

Form PCT/ISA/237 (nine (9) pages), Aug. 23, 2010.
European Search Report dated Mar. 3, 2010 (eight (8) pages).
"Astrium Services EDRS Phase 0 Study" European Space Agency, retrieved from the Internet: http://telecom.esa.int/telecom/www/object/index.cfm?fobjectid=29437> Oct. 22, 2008, pp. 1-4, XP002571180.
M. Lucente et al., "Future Perspectives for the New European Data Relay System", Aerospace Conference, 2008 IEEE, Mar. 1, 2008, pp. 1-7, XP031256192.

* cited by examiner

VIRTUAL POLAR SATELLITE GROUND STATION FOR LOW ORBIT EARTH OBSERVATION SATELLITES BASED ON A GEOSTATIONARY SATELLITE POINTING AN ANTENNA OVER AN EARTH POLE

FIELD OF THE INVENTION

The present invention relates to the communication between a terrestrial Satellite Ground Station (SGS) with one or more polar orbiting Low Earth Orbit (LEO) spacecrafts (e.g. satellites).

BACKGROUND OF THE INVENTION

Current SGS cannot see a particular polar orbiting LEO Earth Observation (EO) satellite at each of its orbits around the earth (typically 14 orbits per day). It can happen that a LEO satellite is not able to exchange TT&C (Telemetry, Telecommand & Control) or receive tasking commands, or not able to download imagery data or sensor data during several consecutive orbits.

The number of visibility periods for a given SGS depends on the latitude of the SGS, typically an average of 5 contacts of 10 minutes each per day can be achieved from European latitudes (for example in Toulouse), and up to 10 contacts of 10 minutes each per day for a polar SGS (located for example in Sweden or in Svalbard).

However even with a polar SGS, or a network of SGS the situation is not perfect and faces many problems. These problems comprise non-technical problems of sovereignty using terrestrial means located in foreign countries.

Further there are problems of congestion. More and more EO satellites with increasing data streams are using the existing polar SGSs. It is expected that the next generation of satellites will congest the existing bandwidths, especially at the North Pole.

A further technical problem is that not all orbits are seen by the SGS. Therefore, a fixed response time cannot be guaranteed. Furthermore, the main polar SGSs are in the northern hemisphere, it is difficult to establish polar SGS in the southern hemisphere. As a consequence the southern part of the orbits is not used in an optimal way.

The prior art tries to solve these problems mainly by the following two approaches. Both approaches use data relay satellites. The first approach uses data relay satellites with radio frequency (RF) inter-satellite links while the second approach uses data relay satellites with optical laser inter-satellite links.

For relay satellites using RF inter-satellite links an antenna for tracking the LEO satellite is needed. This includes the need for a tracking mechanism with potential vibrations, life duration and weight problems. Further, this technique needs to move the antenna on the data relay satellite to acquire the line of sight, followed by a tracking of the low orbit EO satellite during the communication. Further it requires a large movement of the antenna to acquire the next EO satellite. A further problem is that these tracking antennas are generally large and can only be accommodated on rather big and expensive satellites.

For relay satellites using optical laser inter-satellite links the communication is established through an optical link. The communications need tracking at both extremities of the link, and involve in general light weight tracking mechanisms.

However, the models of optical laser terminals that will actually fly in the next coming years are both heavy and expensive, thus limiting the adoption of this technology to low orbit EO satellites with one or more of the following characteristics: large EO satellites, well funded/rich EO satellites programs, EO satellites with needs of transmission of large data files.

Another problem of optical laser technology is the time needed to acquire the line of sight between the geostationary satellite (GEO) and the low orbit EO satellite. This period of time can be as high as many tens of seconds. During this period there is no data communication between the data relay satellite and the low-orbit satellite. Thus, the communication efficiency of the system is reduced.

Further information to the prior art can be found in (1) European Data Relay System: The Space Segment, R. Giubilei, M Lisi and A. Morando Alenia SpazioSpA—Via Saccomuro, 2400131 Roma—Italy—AIAA-94-0906-CP; (2) The European Data Relay System: Present Concept and Future Evolution, Glullano Berretta, Agostino de Acostini, and Antony Dickinson—Proceedings of the IEEE, Vol. 78, No. 7, July 1990; and (3) Future Perspectives for the New European Data Relay System, M. Lucente, E. Re, T. Rossi, M. De Sanctis, C. Stallo, E. Cianca, M. Ruggieri, R. Winkler, A. Pandolfi.

SUMMARY OF THE INVENTION

Exemplary embodiments of the present invention overcome the problems of the prior art, in particular the need for a tracking mechanism including the movement of an antenna on the data relay satellite to acquire the line of sight followed by a tracking of the low orbit EO satellite during the communication.

In one embodiment, the present invention provides a satellite system comprising a satellite operating in an orbit around the Earth; a satellite operating in another orbit around the Earth; where the satellite points a fixed beam at least temporarily to a zone above the Earth's surface through which the satellite passes.

Another embodiment of the present invention provides a satellite system where the one satellite is a geostationary satellite and its orbit is a geostationary orbit and where the other satellite is a low earth orbit satellite and its orbit is a low earth orbit.

Another embodiment of the present invention provides a satellite system where the one satellite points more than one fixed beam at least temporarily to more than one zone above the Earth's surface where through each of these zones at least one satellite passes.

Another embodiment of the present invention provides a satellite system where the one satellite points one fixed beam at least temporarily to a zone of a super-polar space above the Earth's North Pole or to a zone of a super-polar space above the Earth's South Pole or simultaneously a first fixed beam at least temporarily to zones of a super-polar space above the Earth's North Pole and a second fixed beam at least temporarily to zones of a super-polar space above the Earth's South Pole.

Another embodiment of the present invention provides a satellite system which further comprises a terrestrial satellite ground station where communications between the terrestrial satellite ground station and the one or more other satellites are sent via the one satellite operating as a relay satellite for these communications.

Another embodiment of the present invention provides a satellite system where the communication between the one satellite and the one or more other satellites is performed via the fixed beams of the one satellite.

Another embodiment of the present invention provides a satellite system where the one or more terrestrial satellite ground stations are equatorial, middle-latitude and polar relay stations being located circumferentially along Earth's equator, in regions of Earth's middle-latitudes and near Earth's poles, respectively.

Another embodiment of the present invention provides a satellite operating in an orbit around the Earth comprising one or more antennas capable of pointing one or more fixed beams at least temporarily to one or more zones above the Earth's surface.

Another embodiment of the present invention provides a satellite where the satellite is a geostationary satellite and the orbit is a geostationary orbit.

Another embodiment of the present invention provides a satellite where the one or more zones are of a super-polar space above the Earth's North Pole or of a super-polar space above the Earth's South Pole or simultaneously of a super-polar space above the Earth's North Pole and the Earth's South Pole.

Another embodiment of the present invention provides a satellite that further comprises means for being capable of being a relay satellite for communications between one or more terrestrial satellite ground stations and one or more satellites orbiting in orbits around the Earth where the satellite uses its fixed beams for communications with the one or more satellites.

Another embodiment of the present invention provides a satellite where the one or more terrestrial satellite ground stations are equatorial, middle-latitude and polar relay stations being located circumferentially along Earth's equator, in regions of Earth's middle-latitudes and near Earth's poles, respectively.

Another embodiment of the present invention provides a method for satellite systems comprising one or more satellites operating in orbits around the Earth, one or more satellites operating in orbits around the Earth, and one or more terrestrial satellite ground stations comprising the steps of: (1) receiving messages from the one or more terrestrial satellite ground stations at the one or more satellites via a link; (2) forwarding the stored messages to the respective one or more satellites via the fixed beams of the one or more satellites; (3) receiving messages from the one or more satellites via the fixed beams of the one or more satellites; (4) forwarding the stored messages to the respective one or more terrestrial satellite ground stations.

For both uplink and downlink the messages can be forwarded immediately (synchronous transmission). However, the invention also discloses the case where the messages are not forwarded immediately but stored before forwarding them (asynchronous transmission). Which means:

Another embodiment of the present invention provides a method for satellite systems comprising further the steps of: (1) storing the messages received from the one or more terrestrial satellite ground stations in the one or more satellites after receiving and before forwarding these messages to the one or more satellites; and storing the messages received from the one or more satellites in the one or more satellites after receiving and before forwarding these messages to the respective one or more terrestrial satellite ground stations.

Another embodiment of the present invention provides a method for satellite systems where the satellite system is in accordance with satellite systems described above.

Another embodiment of the present invention provides a method for satellite systems where the one or more satellites serving as a relay station are in accordance with satellites as described above.

Another embodiment of the present invention provides a method for satellite systems where the one or more terrestrial satellite ground stations are equatorial, middle-latitude and polar relay stations being located circumferentially along Earth's equator, in regions of Earth's middle-latitudes and near Earth's poles, respectively.

Further, the invention solves the problem of communication at each orbit, between the earth and low orbit EO satellites by using a data relay satellite using a radio frequency inter-satellite link without the need for a tracking antenna.

The invention uses one or more data relay satellites (to avoid the problems of terrestrial ground stations), radio frequency technology (to avoid the problems of the optical laser terminals), and a fixed antenna (to avoid the problem of a tracking antenna).

One embodiment of the present invention includes one satellite which operates in a geostationary orbit. This satellite is capable of providing a variety of communication services to low orbit EO satellites when the satellites are passing over the earth South Pole by the mean of a radiofrequency inter-satellite link.

Another embodiment of the invention includes an antenna on the geostationary satellite with a fixed beam pointing towards the South Pole and a small antenna (see examples in the detailed description) on the low orbit EO satellites.

A further embodiment of the invention utilizes an antenna on the geostationary satellite pointing towards the North Pole.

Yet another embodiment of the invention utilizes two antennas one pointing towards the North Pole and the other one towards the South Pole.

Yet another embodiment of the invention utilizes two antennas: one pointing towards the North Pole on a first geostationary satellite, and another one towards the South Pole on a second geostationary satellite.

Here and later in this document the invention is described using a radio frequency link. This is done only for descriptive purposes. It is explicitly disclosed that all embodiments of the invention can be applied in connection with other wavelengths, too. These other wavelengths include optical wavelengths in particular in connection with laser technology.

In these embodiment the geostationary satellite or satellites will provide a variety of data communication services to low orbit EO satellites including TT&C services—by transferring telemetry, telecommand (including tasking) and control between earth and the EO satellite—and data relay services—by transferring imagery or sensor data from the EO satellite to the earth via the geostationary satellite.

The invention provides multiple advantageous technical effects and benefits.

A. For Users of EO Imagery Data
- an improved response time between tasking and imagery delivery to the users;
- a technique to insure that tasking can be performed at each orbit—typically every 100 minutes; or twice per orbit, typically each 50 minutes with a configuration with 2 antennas, one over each earth Pole.
- a technique to insure that imagery data download—at least for a set of the most urgent imagery—can be performed at each orbit.

B. For Low Orbit EO Satellite Operators
  Concerning the forward link: a guaranty of one (1) tasking (or TT&C) communication slot per orbit while the satellite is passing over the South Pole—a typical duration of more than 1 minute is achieved by the invention.
  Concerning the return link: a guaranty of one (1) imagery data relay communication slot per orbit when the satellite is in the vicinity of the South Pole and when the line of sight between the geostationary satellite and the low orbit EO satellite is not obstructed by the earth—a typical duration of 10-15 minutes is achieved by the invention.
  The invention provides the capabilities of a virtual polar ground station located at the South Pole.
  A technique to improve the low orbit EO satellite utilization and concept of operations
  by using part of the orbit over the South Pole for communication purposes instead of more valuable periods over ground earth, when the satellite is acquiring images;
  by creating a clear cut between times when the low orbit EO satellite is doing imagery acquisition tasks (which may need doing complex maneuvers) and times when the satellite is doing communication tasks.
  For EO operators contemplating a geostationary satellite: a low cost/low mass solution (3-5 M€/10-20 kg) compared to other solutions including the state of the art optical laser terminal of (10-20 M€/50-60 kg) that will be implemented.
  An attractive cost/benefit solution compared to alternative technologies.
C. For Potential Operator of Data Relay Satellites
  The invention provides a solution without a tracking antenna thus reducing the problems of weight, duration of life and vibration of tracking data relay antennas.
  The invention provides a solution that can be used for TT&C only, or for mission data relay communication (imagery or sensor data), or for a combination of both.
  The invention uses a fixed antenna on the geostationary satellite thus avoiding the acquisition time of the line of sight before a communication session for the forward link can be started (from the geostationary satellite to the low orbit EO satellite). This characteristic increases the potential operational time of the data relay service.
  If this invention is implemented on a GEO for TT&C only, the invention can be used for large number of LEOs given that TT&C and tasking communication slots are in general of short duration; and that in general 2 LEOs are not passing over one earth Pole at the same time.
  If the invention is implemented on a GEO for TT&C and tasking only, in combination with a tracking laser or a tracking RF inter-satellite link, the invention permits a better use of the laser or of the RF inter-satellite link. At the same time the GEO tracks a given LEO for imagery data or sensor data relay service, the GEO can provide TT&C service to other LEOs passing over the Pole without the need to stop the tracking service. In other words, the invention makes possible a better use of laser or RF links for imagery and sensor data relay.
  A cost efficient solution compared to alternative technologies.

BRIEF DESCRIPTION OF THE DRAWINGS

Embodiments of the invention will now be described with reference to the accompanying drawings in which.

DESCRIPTION OF PREFERRED EMBODIMENTS

Satellite Constellation

Figure 1:
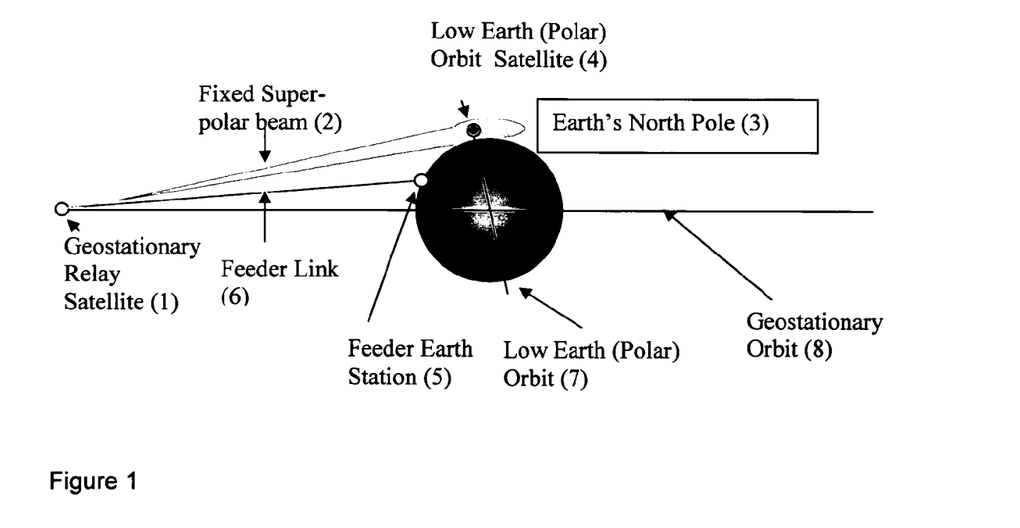
FIG. 1 is diagram showing important features of the invention

One embodiment of the invention relates to a satellite constellation. Referring to FIG. 1, the satellite constellation comprises at least one geostationary satellite (1) and at least one low earth orbit satellite (4). The satellite constellation provides communication between a feeder earth station (5) and the low earth orbit satellite (4) even in case that there is no line-of-sight between the feeder earth station (5) and the low earth orbit satellite (4).

On the geostationary satellite (1) one or more antennas are integrated capable of pointing one at least temporarily one or more fixed super-polar beams (2) to a zone of a super-polar space above the Earth's North Pole (3) (region above the North Pole) through which the orbit (trajectory) of the low earth orbit satellite (4) passes, whereas the one or more fixed super-polar beams (2) cover at least part of the zone.

The direction of the super-polar beams (2) is fixed at least temporarily with respect to the zone of the super-polar space. These fixed super-polar beams (2) do not move and in particular do not track the low earth orbit satellite during communication. Nevertheless, it is possible to redirect the super-polar beams (2) from time to time to other zones—for example from the North Pole to the South Pole in order to reconfigure the setup of the space infrastructure (4). In other words, the super-polar beams (2) do not move in order to maintain communication with one low earth orbit satellite (4). However, the super-polar beams (2) can be moved from time to time.

On the low earth orbit satellite (4) a small antenna is integrated for communication purposes with the geostationary satellite (1).

If the feeder earth station (5) intends to communicate with the low earth orbit satellite (4), it sends signals/messages via the feeder link (6) to the geostationary relay satellite (1). The geostationary relay satellite (1) forwards the signals/messages received from the feeder earth station (5) via fixed super-polar beams (2) to the low earth orbit satellite (4) when the low earth satellite passes through the zone. This forwarding can be done immediately or by storing the signals/messages and forwarding them at predefined times.

Communication from the low earth orbit satellite (4) to the feeder earth station (5) is done accordingly, in the reverse order.

Because of the fixed beam no tracking means as described by the prior art are needed.

In another embodiment of the invention and in contrast to the embodiment above the one or more fixed super-polar beams (2) point to a zone of a super-polar space above the Earth's South Pole (region about the South Pole) instead of the North Pole.

In a further embodiment of the invention and in contrast to the embodiments above the one or more fixed super-polar beams (2) point to a zone of a super-polar space above the Earth's North Pole and above the Earth's South Pole.

Another embodiment of the invention in particular advantageous for TT&C services on the geostationary satellite (1) two antennas are integrated—the first antenna is pointing a fixed super-polar beams over the North Pole (4)—the second antenna is pointing a fixed super-polar beam over the South Pole. These 2 beams provide TT&C services to the LEO satellites when they are passing over the North Pole and over the South Pole. The TT&C service is provided twice per orbit—or typically every 50 minutes to an Earth Observation satellite orbiting in Sun synchronous orbit.

In yet another embodiment of the invention in particular for TT&C services, there are 2 beams on 2 different GEO satellites.

In yet another embodiment of the invention the 2 fixed super-polar beams over the North Pole and over the South Pole on 1 or 2 GEO satellites are complemented by 1 or several trimmed or steerable beams capable of covering a portion of space over an Earth footprint located in the visibility of the GEO satellite. The trimmed or steerable beam is providing TT&C service to a given LEO for urgent tasking request up to quasi-near-real-time before the acquisition of image or sensor data when the given LEO is passing in the portion of space covered by the trimmed or steerable beam, without disrupting the general TT&C service provided to all other LEO satellites twice per orbit when they are passing over the North Pole or over the South Pole.

All the embodiments of the invention can involve the combination of one or multiple geostationary satellites (1) with one or multiple low earth orbit satellites (4). For purposes of clarity, the description uses only one geostationary satellite (1) and only one LEO satellite (4).

The technique is applicable to any application requiring communication with a polar orbiting LEO platform. TT&C and mission data relay (imagery or sensor data) applications are considered as important applications for the invention.

Figure 7:
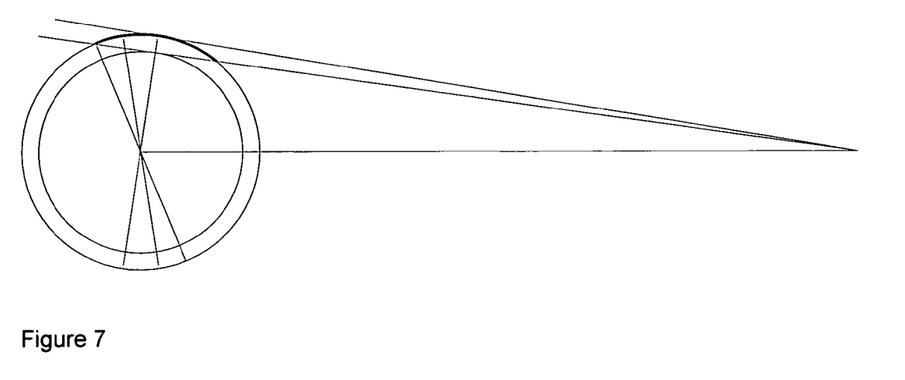
FIG. 7 shows a scheme for dimensioning and shaping the beam so as to achieve a more consistent contact time with the LEO spacecraft
Figure 8:
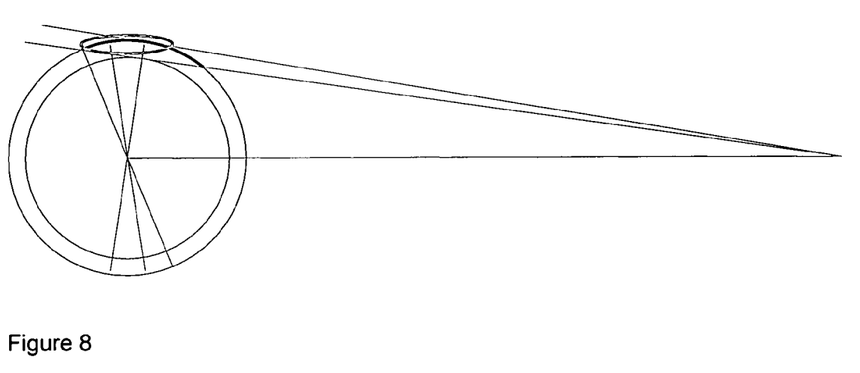
FIG. 8 shows a scheme for dimensioning and shaping the beam so as to achieve a more consistent contact time with the LEO spacecraft

Schemes for dimensioning and shaping the beam so as to achieve a more consistent contact time with the LEO spacecraft on each polar transit are additionally proposed in FIGS. 7 and 8.

FIG. 7 shows the geometry of the system while FIG. 8 shows how to define an approximation of the beam that maximizes the minimum contact time common to all LEO contacts irrespective of the angle of their orbital plane about the polar axis with respect to the geostationary platform location.

The scheme for equalising the minimum contact time between GEO and LEO irrespective of the angle between the LEO orbital plane and the GEO position is illustrated by FIGS. 7 and 8.

FIG. 7 shows the geometry of the contact between the GEO platform and the LEO platform in its polar orbit.

The inner circle shows the earth, the outer the LEO orbit.

The upper line from the GEO, tangential to the LEO orbit corresponds to the highest elevation of the LEO as seen from the GEO.

The lower line, tangential to the earth's surface corresponds to the lowest super-polar elevation of the LEO as seen from the GEO.

These lines define the elevation range of the super-polar beam.

The shaded portion of the LEO orbit represented by the darker arc between the lines shows the portion of the LEO orbit within the beam in the case that the LEO orbit plane is in line with the vector from the earth to the GEO, i.e. the orbit is edge on to the GEO. This represents relative orientation of LEO orbital plane and GEO position which gives the longest contact time for the LEO.

The 2 diameter lines either side of the north south line correspond to sun synchronous orbits of 98.6 degrees inclination as seen edge on from GEO.

FIG. 8 shows the same geometry as seen from a GEO at a longitude 90 degrees from the first GEO (with the field of view of the reader), such that the plane of the LEO orbit is perpendicular to the vector between the earth and the GEO. This geometry corresponds to the minimum contact time between the LEO and the GEO.

The superimposed ellipse shows the beam shape as seen from the GEO.

The elevation range corresponds to the elevation range identified in FIG. 7. The Azimuth Range of the ellipse is chosen to equalise as far as possible the minimum contact time between LEO and GEO for any angle between the plane of the LEO orbit and the GEO position. This is done by setting the limiting contact point at the left hand side of the ellipse to the limiting contact point between the LEO and a GEO with the Geometry shown in FIG. 7 (the end of the shaded arc) and making the pattern symmetrical about the pole.

The LEO contact time in this geometry corresponds to the portion of the shaded arc bounded by the ellipse. With this beam profile contacts between LEO and GEO should be at least this long irrespective of the orientation of the LEO and GEO, providing a fairly well equalised minimum contact time independent of the geometry of an individual contact.

The effect of this is illustrated by the contact time analysis results in table 3.

Figure 2:
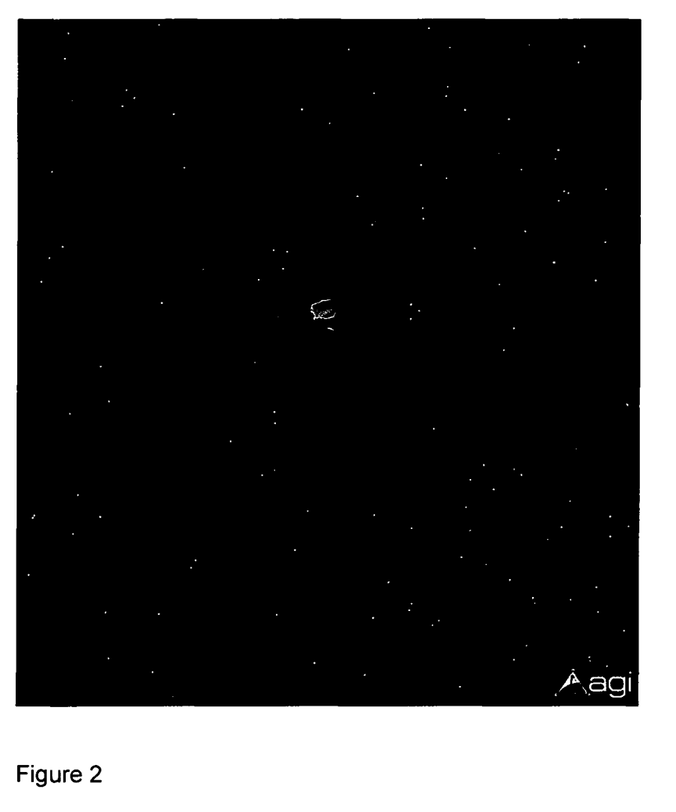
FIG. 2 shows the geometry of the system of the invention in three dimensions

The geometry of the satellite constellation in 3 dimensions is shown in FIG. 2. In this case both north and south polar beams are shown, with LEO satellite orbits of 800 and 1000 km altitude.

The invention is described using a radio frequency link. This is done only for descriptive purposes. It is explicitly disclosed that all embodiments of the invention can be applied in connection with other wavelengths, too. These other wavelengths include optical wavelengths in particular in connection with laser technology.

Method for Satellite Communications

One embodiment of the invention relates to a method for satellite communication. Referring again to FIG. 1, this method comprises the following steps:

The geostationary satellite (1) directs one or more antennas in such a way that one or more fixed super-polar beams (2) point at a zone of super polar space above the Earth's North Pole (3) (region above the North Pole). Before or after that the feeder earth station (5) establishes a feeder link (6) to the geostationary satellite (1). After establishment of both links, the feeder earth station (5) sends a message via the feeder link (6) to the geostationary satellite (1). The geostationary satellite (1) relays the message via the fixed super-polar beam(s) (2) to the low earth orbit satellite (4) when the low earth orbit satellite is within one of the beams of the fixed super-polar beam(s) (2). Communications from the low earth orbit satellite (4) to the feeder earth station (5) are performed accordingly. The low earth orbit satellite (4) can communicate whenever it is in one of the fixed super-polar beams (2).

The geostationary satellite can work either in real-time or synchronous way (meaning that the 2 links are established and the data is just relayed), or in an asynchronous way with a memory onboard buffering the messages.

In another embodiment of the method of the invention and in contrast to the embodiments above the one or more fixed super-polar beams (2) point to a zone of a super-polar space above the Earth's South Pole (region about the South Pole) instead of the North Pole.

In a further embodiment of the method of the invention and in contrast to the embodiments above the one or more fixed super-polar beams (2) point to a zone of a super-polar space above the Earth's North Pole and above the Earth's South Pole.

All the embodiments of the invention can employ the combination of one or multiple geostationary satellites with one or multiple LEO satellites. The description uses only one geostationary satellite and only one LEO satellite for reasons of clarity of description.

The technique is applicable to any application requiring communication with a polar orbiting LEO platform. TT&C and mission data relay applications are considered as important applications for the invention.

The invention is described using a radio frequency link for descriptive purposes only. It is explicitly disclosed that all embodiments of the invention can be applied in connection with other wavelengths, too. These other wavelengths include optical wavelengths in particular in connection with laser technology.

Geostationary Satellite

One embodiment of the invention relates to the geostationary satellite of the satellite constellation.

On the geostationary satellite (1) one or more antennas are integrated capable of pointing one or more fixed super-polar beams (2) at a zone of super polar space above the Earth's South Pole (3) (region above the South Pole) and/or at a zone of super polar space above the Earth's North Pole (3) (region above the North Pole).

In other words, the equipment required on board the Geostationary Relay Satellite (1) is an antenna system capable of providing coverage of the super polar spaces. The antenna system may use a single or multiple beams to achieve the required polar coverage and may cover one or both polar regions. An important aspect of the system is the polar beam coverage pattern, and a number of antenna technologies may be used to realize this beam pattern.

Some variation on the precise shape of the polar coverage is also possible within the scope of the system, for example simple elliptical beams may be projected or a shaped beam matching more accurately the curvature of the earth, depending on the aperture available on board the GEO platform and the contact characteristics with the LEO Spacecraft required for the specific mission scenario.

A single reflector and feeder arrangement may be used to generate the pattern required or as an alternative implementation of the system, multiple antenna feeders may be used to generate the same overall beam coverage as an overlapping series of smaller spot beams. This approach gives the potential to increase the gain of the beam toward the LEO spacecraft (4) at the expense of additional complexity (feeder accommodation, possible extra amplifiers and/or beam switching arrangement).

Additional equipment required to create a complete working data relay system includes is a feeder link antenna to provide the link between the geostationary platform (1) and the ground, and a communications transponder (which may be transparent or regenerative).

A regenerative transponder may include on-board memory to provide a 'store and forward' service for tasking commands for the LEO Spacecraft (4), buffering the commands on board the GEO (1) until the LEO spacecraft (4) comes into visibility.

Alternatively, the commands may be broadcast repeatedly as part of a cycling stream broadcast of data that the LEOs (4) can receive and extract messages addressed to them from.

Different antenna technologies may be used to realize the link to the Low Earth Orbit Satellite (4) according to mission requirements. For low rate TT&C and tasking applications a low directivity antenna may be used which may have a fixed geometry beam. Switched patch antennas or patch arrays might be used for this application. For higher rate mission data relay applications a higher directivity antenna with some form of beam steering can be used. For example, it could be a slight East-West steering over the Pole, keeping enough bandwidth to serve all other LEOs over the Pole with low rate TT&C.

The invention is implemented at the Geostationary end of the link as a Radio Frequency Geostationary Data Relay satellite supporting GEO-LEO Inter-Satellite Links using the specific fixed beam polar coverage of the invention.

The invention is described using a radio frequency link for descriptive purposes only. It is explicitly disclosed that all embodiments of the invention can be applied in connection with other wavelengths, too. These other wavelengths include optical wavelengths in particular in connection with laser technology.

Low Earth Orbit Satellite

One embodiment of the invention relates to the LEO satellite (4) of the satellite constellation.

The equipment on the LEO spacecraft (4) required to use the invention can vary according to the capabilities of the LEO platform (4) and the data rate requirements of the specific LEO mission. The required equipment comprises: (1) Inter-satellite Link Antenna System (fixed low directivity or steered); (2) inter-satellite Link Tx/Rx RF equipment; and (3) inter-satellite Link Modem system.

For TT&C and tasking applications a connection is required between the inter-satellite Link Modem and the platform flight computer system/avionics to transfer Telecommand and tasking data received from the GEO relay satellite (1) to the flight or mission control computer and to obtain Telemetry data from the avionics for transmission to the GEO relay satellite (1).

For Mission Data Relay applications, a connection is required between the inter-satellite Link Modem and the payload data handling/mass memory system to transfer the mission data to the modem for transmission via the Geostationary Relay Satellite to the ground.

Different antenna technologies may be used to realize the link to the Geostationary relay Satellite (1) according to mission requirements. For low rate TT&C applications a low directivity antenna may be used which may have a fixed geometry beam. Switched patch antennas or patch arrays might be used for this application. For higher rate mission data relay applications a higher directivity antenna with some form of beam steering can be used.

Beam steering may be achieved via mechanical or electronic steering of a moveable antenna, or via pointing of the host platform where a fixed antenna is used.

The invention is described using a radio frequency link for descriptive purposes only. All embodiments of the invention can be applied in connection with other wavelengths, too. These other wavelengths include optical wavelengths in particular in connection with laser technology.

Current Systems Addressing the Applications at which the Invention is Aimed

Current systems which are used for similar applications to the invention are Ground Stations, Polar Ground Stations and Tracking Inter-Satellite Links.

Ground Stations and Polar Ground Stations may be used for TT&C or mission data recovery from polar orbiting LEO satellites.

Geostationary satellites equipped with a tracking Inter-Satellite Link antenna may also be used for TT&C and mission data relay for polar orbiting LEO satellites.

Advantages of the Invention Compared to Current Alternative Systems Ground Stations:

Ground Stations have in general less performance than Polar Ground Stations since the visibilities between the LEO and the ground are reduced due to lower latitude. Advantages (1), (2), (3), (4), (8), (9) of the invention of the Polar Ground Station paragraph apply to Ground Station.

Polar Ground Stations:

One important advantage of the invention over current Polar Ground Station systems include: (1) Communication with LEO spacecraft on every orbit; (2) more consistent communication contact time on each polar transit; (3) lower variability of link characteristics during each contact; (4) ready communication at both North and South Poles; (5) ease of access of end user for data recovery, elimination of data repatriation issues; (6) removal of need for international agreements for creation of/access to ground infrastructure in foreign countries; (7) elimination of security issues associated with Tasking via infrastructure in a foreign country; (8) communication with many LEO platform simultaneously; (9) removal of need for many ground antennas to serve multiple LEOs in parallel.

These advantages are further explained in the following.

An advantage of the invention when compared with Polar Ground Stations is the fact that the invention allows communication with the LEO spacecraft on every orbit, whereas typical polar ground station locations do not allow the polar LEO satellite to be seen on every orbit, having some gap orbits where no contact is possible.

Additionally, the invention can provide a more consistent minimum contact time per polar transit whereas the contact time of the Polar Ground Station with the LEO can vary considerably from orbit to orbit.

The geometry and link characteristics can also change significantly and rapidly over the duration of the contact with a polar station, from geostationary orbit using the Invention, the look angle and percentage path length changes are less significant.

For mission data recovery applications, the remoteness of the polar ground station locations can present a significant problem in recovering the data from the polar ground station to the end user of the data, with the Invention the end user may access the feeder link to the geostationary relay satellite and recover the data directly.

Additionally the polar ground station system requires facilities in countries which may not be the same as the end user. This may present international agreement issues if new polar ground infrastructure is required.

Further, for TT&C applications, getting the tasking/telecommand data to the polar ground station for transfer to the LEO spacecraft may present a security risk if the data has to pass through/to foreign countries. Direct access of the feeder to the geostationary satellite using the Invention to communicate with the LEO spacecraft can remove this issue.

A further advantage of the invention over Current Polar ground Station systems is that it readily allows communication at both poles, whereas there are currently few if any commercially available Polar Ground Station facilities at the South Pole.

This additional flexibility doubles the window of opportunity for data transfer and provides the potential for 2 TT&C contact slots on every orbit of the LEO spacecraft.

For spacecraft moving south to north, the provision of a south polar TT&C slot means that tasking instructions for the south north pass may be sent to the LEO in a timely manner just before the transit.

The fact that a polar ground station antenna needs to be pointed at and track the LEO spacecraft as it moves rapidly across the field of view means that one antenna can serve only one LEO satellite in the field of view at any one time, this creates an intrinsic capacity constraint and means that to serve many satellites many antennas are required, with considerable infrastructure expense. With the Invention the system can in principle be used to communicate with many LEOs within the field of view of the polar beam at the same time on a time/frequency/code division multiple access basis, as the extended polar coverage means that the spatial constraint of precise pointing at one Leo spacecraft is removed.

Tracking Inter-Satellite Link:

One important advantage of the invention over current Tracking Inter-Satellite Link systems include: (1) multiple LEO spacecraft can be served simultaneously rather than one at a time; (2) lower mass, power, complexity, cost equipment on board the GEO relay platform; (3) no tracking mechanism associated lifetime issues or failure modes; (4) no disturbance of other payloads via slewing torques or micro-vibrations; (5) no pre-pointing/slewing of the GEO platform antenna required before communication can start.

These advantages are further explained in the following.

Similar considerations to the last point apply to tracking inter-satellite links, as the antenna is steered to track a single LEO spacecraft communications with the LEO spacecraft are restricted to one at a time, limiting the capacity of the system in terms of number of users, whereas the invention can implicitly serve several users in parallel/simultaneously within the constraints of available spectral bandwidth and transmit power.

A typical tracking inter-satellite link system is similar to the invention in terms of feeder and RF equipment but differs in terms of the antenna. A typically large antenna mounted on an rapidly scanning antenna pointing mechanism with an open or closed loop tracking system are required. The antenna is scanned rapidly to track the movement of the LEO spacecraft and allow a communications link to be established.

Compared with this, the invention offers the advantage that the equipment on board the geostationary platform is much simpler, a fixed (or trimmed/limited motion only) beam, without the mass, power requirements and complexity of the steering and tracking systems.

The antenna steering mechanisms of a tracking inter-satellite link may also have a limited lifetime, or require expensive, complex components to achieve a good lifetime, failure of the mechanism will additionally result on loss of capability, so the invention has potentially higher reliability than a tracking inter-satellite link system.

Rapid slewing events and antenna tracking may also disrupt other satellite payloads either via disturbance of the attitude of the host platform due to the torque and masses involved, or through generated micro-vibrations. The fixed antenna of the invention has no mechanism lifetime issues, no mechanical failure scenarios and will not be disruptive to other on board payloads.

With its fixed coverage, the invention does not require an initial pointing/beam slew period before communication can begin which a tracking inter-satellite link does. In current systems this period can be several minutes long.

An advantage of this system over optical data relay is the fact that a wide range of LEO platforms with different characteristics and different data rates requirements can be supported.

Coverage and Contact Time

Figure 3:
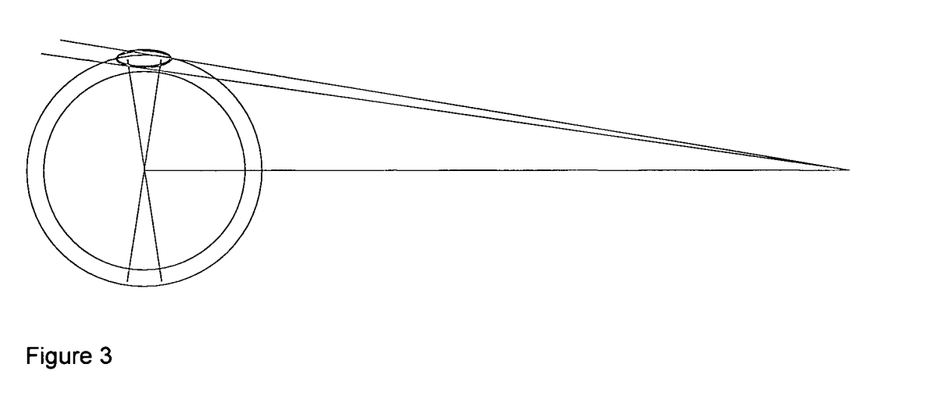
FIG. 3 shows that a minimum polar beam width is required to ensure the LEO spacecraft enter the beam at the pole

Considering sun synchronous orbits inclined at 98.6 degrees, and typical LEO altitudes of 600-1000 km, a minimum polar beam width is required to ensure that the LEO spacecraft enter the beam at the pole irrespective of the orientation of the LEO orbital plan with respect to the geostationary platform generating the polar beam, as both orbit the earth. This is illustrated in FIG. 3.

Calculations show that an antenna beam of 1 degree N-S, 3 degree E-W aspect will encompass the limiting positions of the LEO Spacecraft as seen from GEO above the pole, according to the relative position of the GEO and the LEO Orbital plane.

Figure 4:
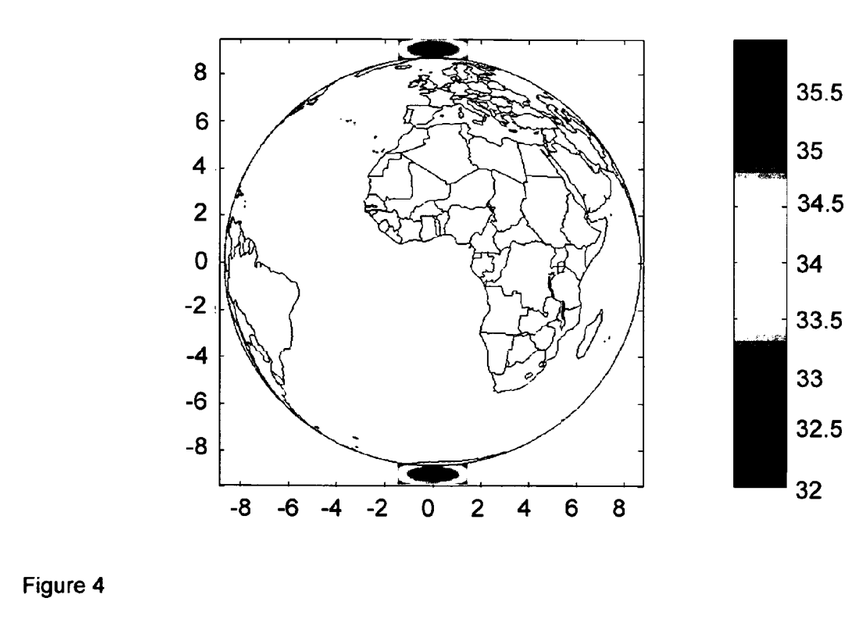
FIGS. 4, 5 and 6 show examples for gain profiles for a simple elliptical beam
Figure 5:
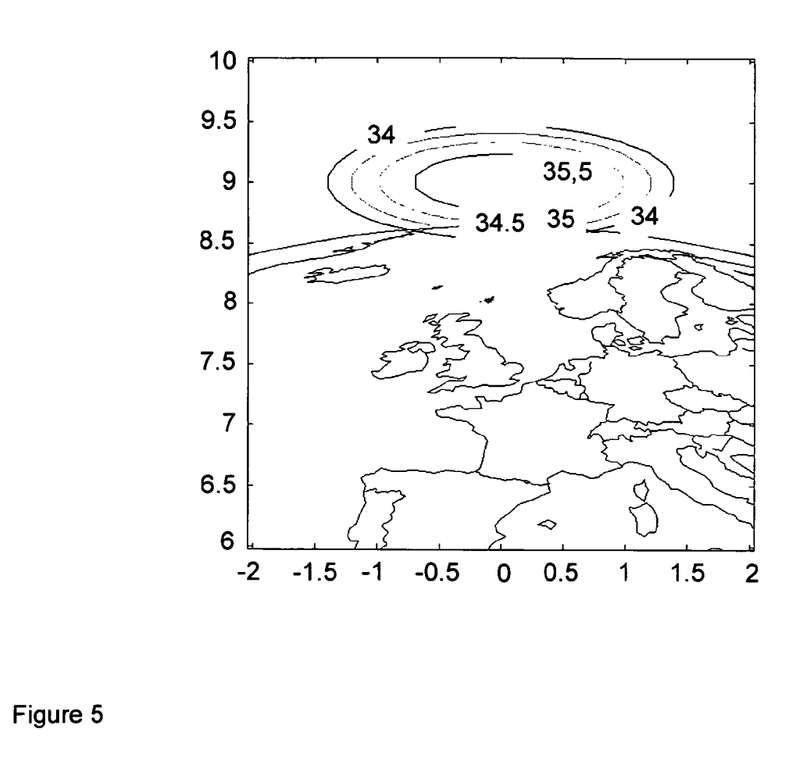
Figure 6:
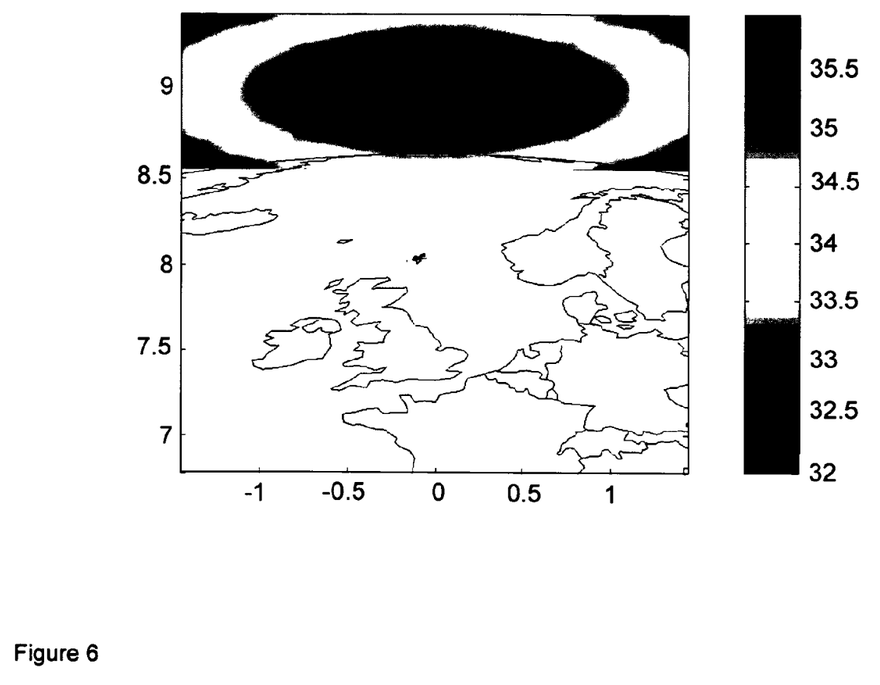

Example gain profiles for a simple elliptical beam generated by a reflector of aperture ~0.8 m in the Ka band for this beam are shown in FIGS. 4, 5 and 6. Gain~36 dBi is predicted.

Flight Dynamics analysis has been done for this beam configuration for a 1000 km altitude LEO. Calculations are summarized in Table 1.

to the beam and the LEO transits through it quickly. Thus, this minimal beam configuration does not offer a consistent contact time.

It would be desirable to secure a good minimum contact time that is independent of the relative orientation of the LEO trajectory and the GEO orbital location and thus the polar beam axis.

Considering again the geometry of the system in FIG. 7, we see that a LEO whose trajectory is in line with the beam axis is in contact for the portion of its orbit highlighted by the dark grey line.

For a 1000 km orbital altitude the far point of the LEO visibility along this arc has a radial vector from the earth centre to the LEO inclined at ~21 degrees relative to the earth north polar axis. If we sweep the vector 180 degrees around the north polar axis we can define an approximate beam which maximizes the minimum contact time common to all LEO contacts irrespective of the angle of their orbital plane about the polar axis with respect to the geostationary platform location. This is shown in FIG. 8.

A first approximation to the ideal beam has been made as a 1.5 degree N-S*7.5 degree E-W elliptical beam and flight dynamics analysis of contact time conducted for this beam angular profile. For the analysis a rectangular rather than elliptical profile for the beam was used due to the constraints of the modeling tool. The gain of the beam is estimated as ~30 dB using a single feed and reflector. This beam profile would be a good candidate for implementation as 3 over-

TABLE 1

| Access | | Start Time (UTCG) | Stop Time (UTCG) | Duration (sec) | |
|---|---|---|---|---|---|
| | | SouthSensor-To-LEO1000 | | | |
| 1 | | 29 Apr. 2009 39:27.7 | 29 Apr. 2009 45:20.2 | 352.429 | |
| 2 | | 30 Apr. 2009 22:53.0 | 30 Apr. 2009 28:49.1 | 356.125 | |
| 3 | | 30 Apr. 2009 08:31.0 | 30 Apr. 2009 13:38.2 | 307.18 | |
| 4 | | 30 Apr. 2009 53:32.7 | 30 Apr. 2009 59:03.9 | 331.174 | |
| 5 | | 30 Apr. 2009 37:38.8 | 30 Apr. 2009 42:59.0 | 320.163 | |
| 6 | | 30 Apr. 2009 21:35.3 | 30 Apr. 2009 37:08.9 | 933.521 | |
| 7 | | 30 Apr. 2009 06:52.8 | 30 Apr. 2009 22:11.7 | 918.952 | |
| 405 | | 29 May 2009 17:21.0 | 29 May 2009 22:43.4 | 322.409 | |
| 406 | | 29 May 2009 02:44.9 | 29 May 2009 07:54.8 | 309.937 | |
| 407 | | 29 May 2009 47:31.7 | 29 May 2009 53:46.2 | 374.494 | |
| 408 | | 29 May 2009 34:45.8 | 29 May 2009 41:09.9 | 384.051 | |
| 409 | | 29 May 2009 10:39.3 | 29 May 2009 26:12.4 | 933.166 | |
| 410 | | 29 May 2009 59:51.8 | 29 May 2009 11:37.6 | 705.779 | |
| 411 | | 29 May 2009 48:15.3 | 29 May 2009 54:54.1 | 398.801 | |
| | | Global Statistics | | | |
| Min Duration | 317 | 23 May 2009 55:50.8 | 23 May 2009 00:57.1 | 306.368 | 5.106133 |
| Max Duration | 402 | 29 May 2009 59:09.6 | 29 May 2009 14:44.1 | 934.487 | 15.57478 |
| Mean Duration | | | | 507.657 | 8.46095 |

The maximum contact duration is ~15.5 minutes, which corresponds to the case when the LEO orbital trajectory is in line with the axis of the beam, giving and extended contact time.

The minimum duration is 5 minutes, which corresponds to the case when the LEO spacecraft trajectory is transverse lapping beams generated by 3 separate feeders and one reflector, providing higher gain with similar coverage.

Along the red arc the path length varies between ~38,000 and ~45,000 km. The look angle of the LEO satellite relative to nadir varies between ~120 and ~60 degrees. Calculations are summarized in Table 2.

Link Geometry Calculations
(Distances in km, angles in degrees)

between the gain of the polar beam and the available contact time with the LEO spacecraft.

TABLE 2

| | | |
|---|---|---|
| Orbit Inclination | 98.6 | |
| LEO altitude | 1000 | |
| LEO Radius | 7378 | |
| Earth Radius | 6378 | |
| Geo Altitude | 35786 | Elevation of northern edge of earth disk from GEO |
| Geo Radius | 42164 | (Elevation of LEO at farthest visible Point) |
| Theta 1 | 8.70 | Maximal Elevation of LEO from GEO |
| | | Elevation of LEO above North Pole from GEO |
| Theta 1a | 10.08 | Angle between LEO radius and GEO tangent at limiting |
| Theta 2 | 9.93 | visibility |
| Theta 3 | 59.82 | Angle of LEO limiting visibility on far side w.r.t.0 deg north |
| Theta 4 | 21.48 | Angle between minimum and maximum elevation of LEO |
| Theta 5 | 1.38 | |

| Closet Point on Arc | Furthest Point on Arc | |
|---|---|---|
| 59.82 | 120.18 | Elevation of LEO |
| 45387.73 | 37969.91 | Range of LEO |
| 5402.90 | | Span of extremities of vector from earth centre to furthers LEO contact point about north pole |
| 42804.65 | | Slant Range of LEO at north pole |
| 7.22 | | Apparent angular separation of extremities from GEO |
| 2181.73 | | Linear separation of northernmost points of oppositely 98.6 degree inclined orbits |
| 2.92 | | Apparent angular separation as seen from GEO |

Flight dynamics analysis is summarized in Table 3.

TABLE 3

| Access | | Start Time (UTCG) | Stop Time (UTCG) | Duration (sec) | |
|---|---|---|---|---|---|
| NorthSensor-To-LEO1000 | | | | | |
| 1 | | 30 Apr. 2009 26:32.7 | 30 Apr. 2009 41:34.7 | 902.041 | |
| 2 | | 30 Apr. 2009 11:21.8 | 30 Apr. 2009 25:06.5 | 824.692 | |
| 3 | | 30 Apr. 2009 57:10.7 | 30 Apr. 2009 10:25.5 | 794.786 | |
| 4 | | 30 Apr. 2009 41:23.0 | 30 Apr. 2009 55:49.7 | 866.652 | |
| 5 | | 30 Apr. 2009 23:25.3 | 30 Apr. 2009 40:29.3 | 1023.98 | |
| 6 | | 30 Apr. 2009 08:13.8 | 30 Apr. 2009 25:32.2 | 1038.383 | |
| 7 | | 30 Apr. 2009 53:41.6 | 30 Apr. 2009 10:58.4 | 1036.827 | |
| 405 | | 29 May 2009 06:10.9 | 29 May 2009 19:14.8 | 783.925 | |
| 406 | | 29 May 2009 50:48.6 | 29 May 2009 04:52.2 | 843.51 | |
| 407 | | 29 May 2009 36:33.0 | 29 May 2009 52:58.1 | 985.105 | |
| 408 | | 29 May 2009 22:14.9 | 29 May 2009 39:34.2 | 1039.225 | |
| 409 | | 29 May 2009 07:33.2 | 29 May 2009 24:48.4 | 1035.137 | |
| 410 | | 29 May 2009 52:28.2 | 29 May 2009 08:41.4 | 973.275 | |
| Global Statistics | | | | | |
| Min Duration | 105 | 7 May 2009 52:18.3 | 7 May 2009 05:19.4 | 781.107 | 13.01845 |
| Max Duration | 149 | 10 May 2009 03:31.2 | 10 May 2009 20:51.0 | 1039.801 | 17.33002 |
| Mean Duration | | | | 931.888 | 15.53147 |

These results show a much tighter grouping of maximum, minimum and average contact time with an average contact time of 15 minutes, Used at both north and south poles a 15 min contact time per polar contact gives a total contact time of ~30 min or ~30% of the total orbit for a typical 100 min LEO orbital period. More detailed analysis with more control over beam profile may demonstrate even better results.

Clearly, further optimization of beam centroid position, angular diameters and shape is possible to adapt the contact time profile and beam gain to individual mission requirements.

Communication contact duration and beam gain are both affected by adjusting the dimensions of the polar beam. In general with the system there is a potential trade to be made For a system serving an individual LEO spacecraft there is a choice between a shorter high rate contact or a longer lower rate contact.

For low rate tasking of a number of LEO spacecraft an extended coverage beam gives more flexibility with respect to contact scheduling and allows time sharing of link resources.

Applications and Link Performance

The invention is applicable to a range of applications requiring communication with a Polar orbiting LEO Platform.

As important applications considered are TT&C/Tasking and Mission Data Relay.

Initial analysis of possible link budgets, assuming a gain of the polar beam from the geostationary relay satellite of ~36 dBi and use of a concatenated RS-Viterbi code with BPSK modulation, gives results as summarized in Table 4.

Link Throughput vs Gain of LEO Antenna

TABLE 4

| Target Eb/No (dB) | 2.5 | 2.5 |
|---|---|---|
| Feeder C/No | 98.83 | 80.58 |
| LEO Gain (dBi) | RTN Throughput (kbps) | Forward throughput (kbps) |
| 0 | 1.38 | 1.93 |
| 3 | 2.76 | 3.85 |
| 5 | 4.38 | 6.11 |
| 10 | 13.84 | 19.31 |
| 15 | 43.75 | 61.04 |
| 16 | 55.08 | 76.82 |
| 20 | 138.35 | 192.62 |
| 23 | 276.04 | 383.18 |
| 25 | 437.48 | 605.19 |
|  | (Mbps) | (Mbps) |
| 30 | 1.38 | 1.88 |
| 35 | 4.37 | 5.58 |
| 37 | 6.92 | 8.41 |
| 40 | 13.79 | 14.85 |
| 44 | 34.47 | 27.65 |
| 45 | 43.31 | 31.32 |
| 50 | 134.04 | 48.23 |

In this example, typical TT&C data rates may be achieved with low directivity antennas <10 dBi.

An array antenna corresponding to the Ka ISL LISA antenna developed by the Technical University of Munich or the COMDEV Ka Inter-Satellite Link using in the Iridium constellation at 37 dBi could support rates >5 Mbps. Using both north and south polar contacts ~12.5 Gbps of mission data could be transferred.

Getting Higher Data Relay Rates

For a given power and antenna aperture capability of the LEO, data relay performance is then driven largely by the gain of the GEO antenna. GEO antenna gain can be enhanced within the scope of the invention whilst maintaining the same key polar coverage by expanding the GEO antenna aperture and dividing the coverage area into a series of smaller higher gain spot beams.

Fixed sub-beams may be generated by means of a large reflector and multiple fixed feed horns. Flexible sub beams may be generated for instance using an array of antenna feed elements and a beam forming payload.

In this case beams within the polar coverage area might be quasi-static to cover the area with the LEO switching from beam to beam as it moves through the coverage area, or might be adaptively optimized so as to effectively track the LEO as it moves and optimize the gain in its direction, and thus the throughput.

A higher gain beam system has the potential to push the data rate capability up into the 100 s of Mbps regime.

Use of the Invention

One use of the invention relates to providing TT&C services for low orbit Earth Observation satellite while they are passing over an Earth pole towards which one antenna of the geostationary satellite is pointed.

Another use of the invention relates to providing TT&C or tasking services and imagery or sensor data relay services for low orbit Earth Observation satellite while they are passing over an Earth pole towards which one antenna of the geostationary satellite is pointed.

The invention claimed is:

1. A satellite system comprising:
a first satellite operating in a first orbit around the Earth; and
a second satellite operating in second orbit around the Earth,
wherein the first satellite includes a fixed beam pointed for an indefinite period of time to a zone, which is calculated to be above and tangential to the Earth's surface, and through which zone the second satellite passes,
wherein the fixed beam does not move in order to maintain communication with the second satellite,
wherein the first satellite is configured to maintain said communication without tracking the second satellite while the second satellite passes through the zone, and wherein the first satellite points one fixed beam at least temporarily to a zone of a super-polar space above the Earth's North Pole or to a zone of a super-polar space above the Earth's South Pole or simultaneously a first fixed beam at least temporarily to zones of a super-polar space above the Earth's North Pole and a second fixed beam at least temporarily to zones of a super-polar space above the Earth's South Pole.

2. The satellite system of claim 1, wherein the first satellite is a geostationary satellite, the first orbit is a geostationary orbit, the second satellite is a low earth orbit satellite, and the second orbit is a low earth orbit.

3. The satellite system of claim 1, wherein the first satellite includes more than one fixed beam at least temporarily pointed to more than one zone above the Earth's surface through which each of these zones the second satellite passes.

4. The satellite system of claim 1, further comprising:
a terrestrial satellite ground station, wherein communications between the terrestrial satellite ground station and the second satellite are sent via the first satellite operating as a relay satellite for these communications.

5. The satellite system of claim 4, wherein the communication between the first satellite and the second satellite is performed via the fixed beams of the first satellite.

6. The satellite system of claim 5, wherein the terrestrial satellite ground station is an equatorial, middle-latitude and polar relay station located circumferentially along Earth's equator, in regions of Earth's middle-latitudes and near Earth's poles, respectively.

7. A first satellite operating in an orbit around the Earth comprising:
one or more antennas with one or more fixed beams configurable to point, for an indefinite period of time, to one or more zones calculated to be above and tangential to the Earth's surface, wherein the fixed beams do not move in order to maintain communication with a second satellite, wherein the first satellite is configured to maintain said communication without tracking the second satellite while the second satellite passes through the one or more zones, and wherein the first satellite points one fixed beam at least temporarily to a zone of a super-polar space above the Earth's North Pole or to a zone of a super-polar space above the Earth's South Pole or simultaneously a first fixed beam at least temporarily to zones of a super-polar space above the Earth's North Pole and a second fixed beam at least temporarily to zones of a super-polar space above the Earth's South Pole.

8. The satellite of claim 7, wherein the first satellite is a geostationary satellite and the orbit is a geostationary orbit.

9. The satellite of claim 7, wherein the first satellite further comprises:
  means for relaying satellite for communications between one or more terrestrial satellite ground stations and one or more second satellites orbiting in second orbits around the Earth where the first satellite uses its fixed beams for communications with the one or more second satellites.

10. The satellite of claim 9, wherein the one or more terrestrial satellite ground stations are equatorial, middle-latitude and polar relay stations located circumferentially along Earth's equator, in regions of Earth's middle-latitudes and near Earth's poles, respectively.

11. A method for satellite systems comprising one or more first satellites operating in first orbits around the Earth, one or more second satellites operating in second orbits around the Earth, and one or more terrestrial satellite ground stations, the method comprising the steps of:
  calculating one or more zones which are above and tangential to the Earth's surface;
  pointing, for an indefinite period of time, fixed beams of the one or more first satellites at the one or more zones through which the one or more second satellites pass;
  receiving messages from the one or more terrestrial satellite ground stations at the one or more first satellites via a link;
  forwarding the messages received from the one or more terrestrial satellite ground stations to the respective one or more second satellites via fixed beams of the one or more first satellites;
  receiving messages from the one or more second satellites via the fixed beams of the one or more first satellites;
  forwarding the messages received from the one or more second satellites to the respective one or more terrestrial satellite ground stations,
  wherein the fixed beams of the one or more first satellites do not move in order to maintain communication with the one or more second satellites, wherein the one or more first satellites are configured to maintain said communication without tracking the one or more second satellites while passing through the corresponding one or more zones to which the fixed beams have been pointed, and wherein the one or more first satellites point one fixed beam at least temporarily to a zone of a super-polar space above the Earth's North Pole or to a zone of a super-polar space above the Earth's South Pole or simultaneously a first fixed beam at least temporarily to zones of a super-polar space above the Earth's North Pole and a second fixed beam at least temporarily to zones of a super-polar space above the Earth's South Pole.

12. The method of claim 11, further comprising the steps:
  storing the messages received from the one or more terrestrial satellite ground stations in the one or more first satellites after receiving and before forwarding these messages to the one or more second satellites; and
  storing the messages received from the one or more second satellites in the one or more first satellites after receiving and before forwarding these messages to the respective one or more terrestrial satellite ground stations.

13. The method of claim 11, wherein the one or more terrestrial satellite ground stations are equatorial, middle-latitude and polar relay stations located circumferentially along Earth's equator, in regions of Earth's middle-latitudes and near Earth's poles, respectively.

\* \* \* \* \*